M. H. SKIFF.
Wheel Cultivator.
No. 40,859.
Patented Dec 8, 1863.
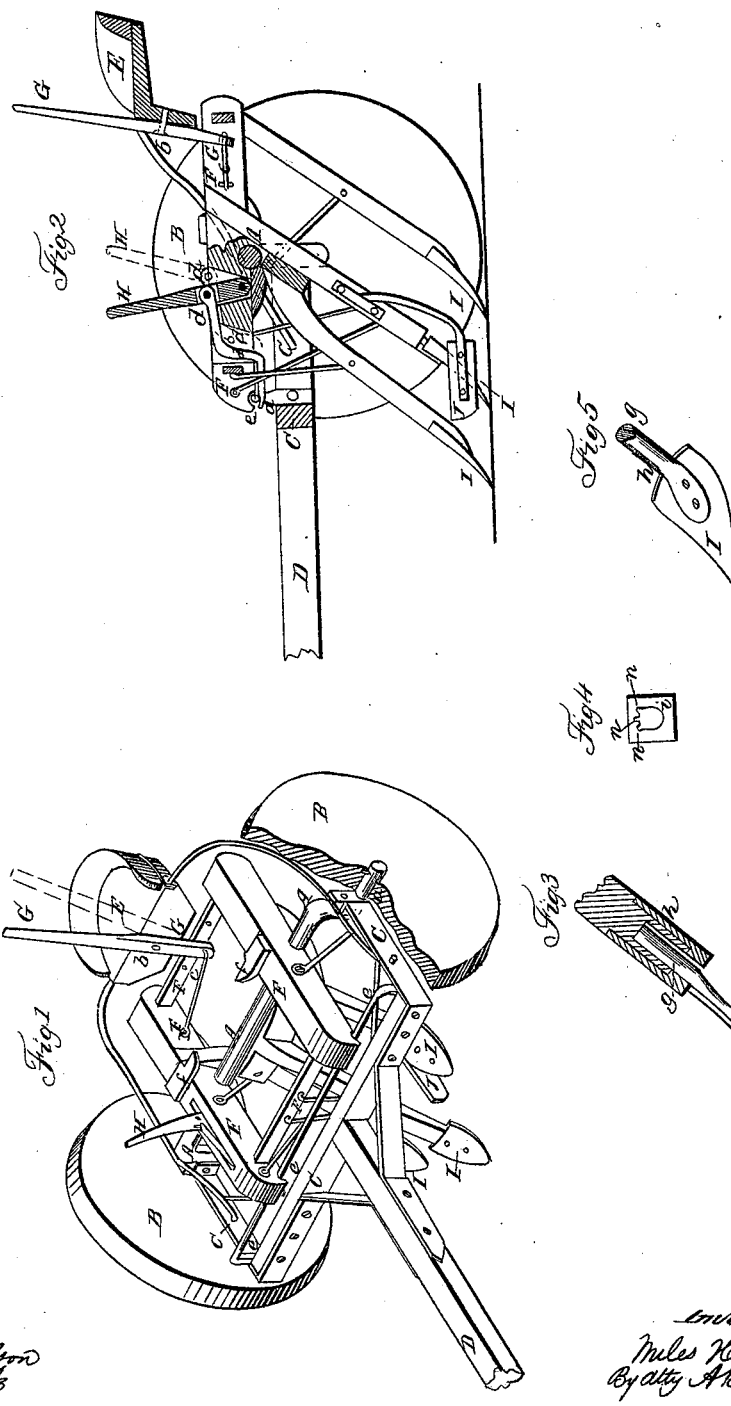

UNITED STATES PATENT OFFICE.

MILES H. SKIFF, OF CORNWALL BRIDGE, CONNECTICUT.

IMPROVEMENT IN CULTIVATORS.

Specification forming part of Letters Patent No. 40,859, dated December 8, 1863.

To all whom it may concern:

Be it known that I, MILES H. SKIFF, of Cornwall Bridge, in the county of Litchfield and State of Connecticut, have invented certain new and useful Improvements in Cultivators; and I do hereby declare the following to be a full, clear, and exact description of the construction and operation of the same, reference being had to the accompanying drawings, making a part of this specification, in which—

Figure 1 represents a perspective view of the cultivator. Fig. 2 represents a vertical longitudinal section through the same, and Figs. 3, 4, and 5 represent details which will be hereinafter more particularly referred to.

Similar letters of reference, where they occur in the separate figures, denote like parts of the machine in all cases.

I am aware that a frame carrying the cultivator-teeth has been made to traverse laterally upon another frame for the purpose of following the windings of a furrow, &c. This I do not claim.

My invention consists in hinging a carriage that carries the cultivator-teeth on or to the axle that supports and carries a second frame, so that said carriage shall not only have a lateral parallel motion, but also a tipping motion, so that when the machine is being moved from field to field, or from place to place, the teeth of the cultivator may be elevated and held up above ordinary intervening obstacles, and locked and held down when they are to be used in cultivating a crop, or in cultivating the soil without the crop, as the case may be.

To enable others skilled in the art to make and use my invention, I will proceed to describe the same with reference to the drawings.

A is a bent axle, supported in two carrying-wheels, B B, and the journals $a$ of said axle may be made adjustable for the purpose of raising or lowering the frames, so that the teeth may penetrate the soil more or less, as may be desired.

Upon the axle A is permanently fixed a frame, C, to which the tongue D is connected, as also the driver's or operator's seat E.

A carriage, F, is united to the axle A, so that said carriage may be moved laterally thereon, as well as be tipped up in front, as will be explained.

To the driver's or conductor's seat E is pivoted, as at $b$, a lever, G, the lower end of which is connected by a link, $c$, to the carriage F, and to the carriage F is pivoted a lever, H, which has a bent bolt, $d$, upon it that takes under a bar, $e$, on the rigid frame C, and the carriage F has, moreover, two braces or feet-supports, $f$, for the driver or operator to place his feet against. By taking the lever G in his hand the driver may shift the carriage F to the right or left, so that the cultivator-teeth united to it may be made to straddle and conform to any sinuosities in the furrow or line of plants being cultivated.

If it should be necessary for any purpose—as, for transportation, or to avoid any intervening obstacle in its path—to raise up the frame F and the cultivators which it carries, the driver, operator, or conductor seizes the lever H, and drawing it back, as shown in red lines in Fig. 2, the frame will drop down behind and correspondingly rise up in front, and thus so elevate the cultivators or plows as that they may be carried above the ground, or such intervening obstacles as usually lie thereon. When the teeth are to be used the driver, by pressing with his feet upon the frame F, may push it down in front, and by running forward the lever H said frame is locked down to the permanent frame C, but may still be moved laterally.

I have shown five plows or cultivators, I, and two guides, J, as connected to the machine. More or less may be used, as may be required, and the machine may be made to work upon two rows at one and the same time. In cultivating corn and such like plants as are in rows the middle one of the five plows is removed.

The plows or cultivators are made, as shown in Figs. 3, 4, and 5, so that they may be turned more toward or from the line of plants to throw the earth more or less toward them. The shanks $g$ for this purpose may have a rib, $h$, upon them, and the sockets $i$ may have grooves $n$ in them, into which the rib of the shank may slip, and it may there be fastened by a pin, or otherwise, and thus the plows or shares may be turned or adjusted to throw the earth more toward or from the plants to be cultivated.

Having thus fully described my invention, what I claim therein as new, and desire to secure by Letters Patent, is—

The combination of the carriage F, that carries the cultivator teeth or plows, with the axle A and with the main frame C, carried on said axle, that the driver from his seat may at pleasure move said carriage laterally, or tip it up or let it down and fasten it down, substantially in the manner and for the purposes herein described and represented.

MILES H. SKIFF.

Witnesses:
A. B. STOUGHTON,
XAVER FENDRICH.